Patented Aug. 12, 1930

1,773,056

UNITED STATES PATENT OFFICE

OTTO MEYER, OF ARNSTADT, GERMANY

PROCESS OF PRODUCING STARCH CAPABLE OF SWELLING IN COLD WATER

No Drawing. Application filed May 8, 1926, Serial No. 107,791, and in Germany December 14, 1925.

It is known, in order to produce starch, capable of being swollen in cold water, that the starch must be treated with alcohol, acetone, and similar substances, and to this is added caustic lye, to separate by distillation the volatile substances and to dry the product obtained. In this process larger quantities of the substances mentioned are required in order to prevent the formation of gum-like lumps at the adding of the caustic lye. The products thus obtained do not possess the necessary or desired swelling capability nor are they of sufficiently high adhesive property. If dissolved in water they are liable to decay rapidly.

It has been found that the alicyclic phenols, ketones and related compounds, especially cyclohexanone and/or hexalin in commerce belonging to the alicyclic phenols, show a quite different action or reaction than that described above. Only very small quantities of these substances are required to avoid, at a subsequent treatment of the starch with aqueous caustic lyes, a gum-like conglomeration of the same and to obtain a loose powder. No distillation is necessary and the product formed in large volumes, which is easy to grind down after the drying, possesses great swelling capability and also great adhesive power. What is further of great importance is that the swelling starch stirred with water is not readily decomposed, this being due to the still existing hydrogenated compounds in small amounts have a preserving effect. The hydrogenated compounds might be diluted with small quantities of alcohol, acetone and the like.

For the production of a swelling starch one proceeds in the following manner: The pulverized starch is thoroughly mixed with the hydrogenated compound, for instance cyclohexanone, and to this mixture caustic lye of 20 to 30% strength, by weight, is added, the mixture being well stirred. After the mixture has been left to settle for some time, about half the alkalinity is removed by acid, whereupon the drying is carried through at 50–70° C. and the product is accurately neutralized by the addition of further quantities of acid, that is, by testing until the same is only slightly alkaline.

Example 100 kg. pulverized potato-starch are admixed with 3 kg. of cyclohexanone and to this mixture 30 kg. of a 30% by weight solution of sodium hydroxide are added during stirring. The mixture is left to settle for one hour and then mixed with 7 kg. of pulverized oxalic acid and subsequently dried at 50 to 70° C., whereupon 6 to 7 kg. of pulverized oxalic acid are added and the whole mass pulverized to a fine powder. Instead of oxalic acid other organic acids may be used. The product must have only a very feeble or slight alkaline reaction.

I claim:—

1. The process of producing starch capable of swelling in cold water which comprises admixing a small quantity of an alicyclic phenol with the starch, adding an aqueous solution of caustic soda to the resultant mixture, and neutralizing the product.

2. The process which comprises admixing a small quantity of alicyclic phenol with a starch, treating the resultant mixture with an aqueous solution of caustic soda, allowing the mixture to settle, adding oxalic acid thereto, and then drying the same.

3. The process which comprises adding to about 100 kg. of pulverized potato starch about 3 kg. of cyclohexanone, adding about 30 kg. of a 20 to 30%, by weight, of an aqueous solution of sodium hydroxide to the resultant mixture while stirring, allowing the mixture to settle, mixing with about 7 kg. of pulverized oxalic acid, drying the mixture, adding 6 to 7 kg. of pulverized oxalic acid to said mixture, and pulverizing the mass to a fine powder.

In testimony whereof I have hereunto set my hand.

OTTO MEYER.